UNITED STATES PATENT OFFICE.

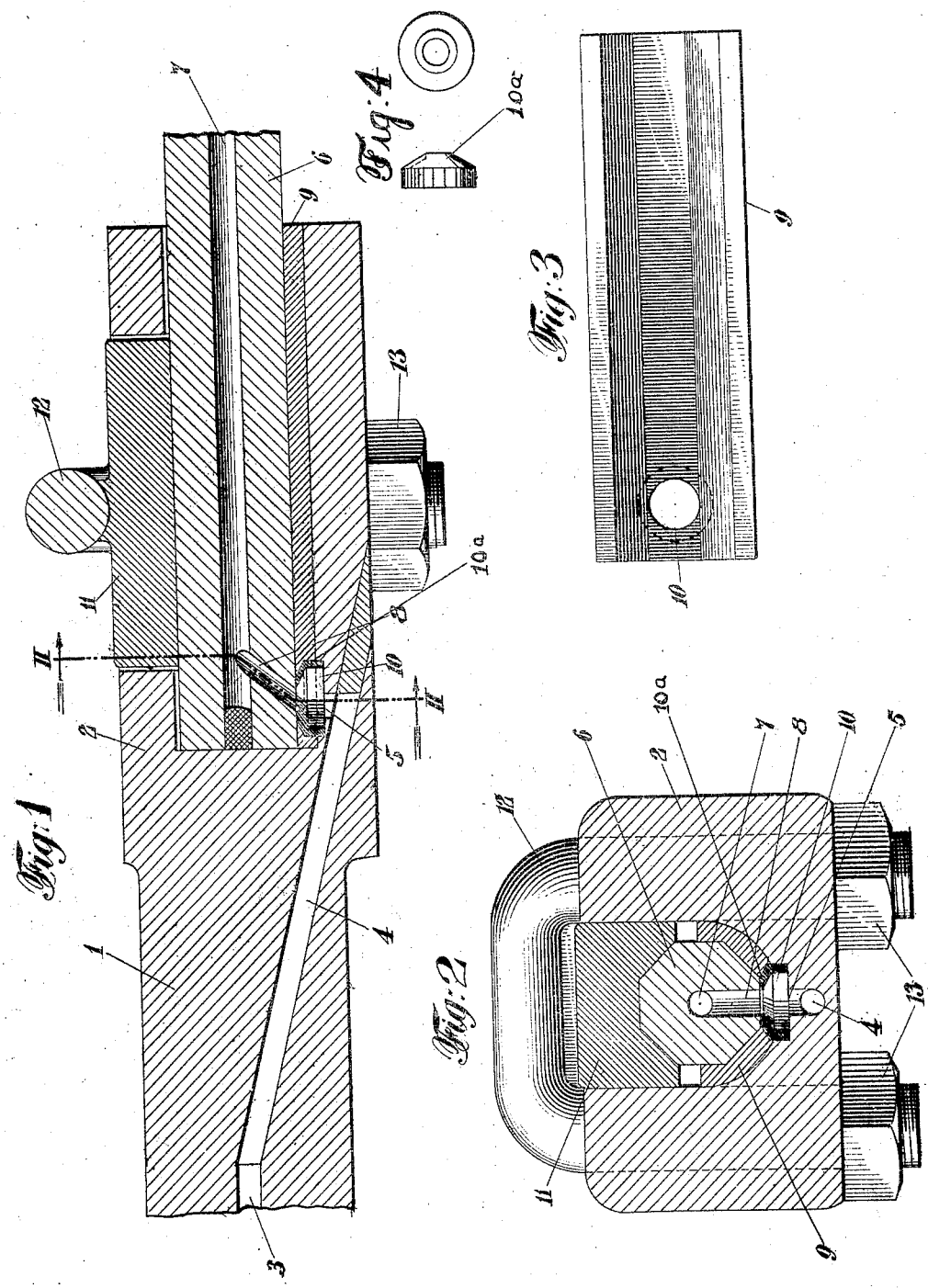

RUSSELL S. CARTER, OF HEWLETT, NEW YORK, ASSIGNOR TO INGERSOLL-RAND COMPANY, OF JERSEY CITY, NEW JERSEY, A CORPORATION OF NEW JERSEY.

WATER-FEED-DRILL CHUCK.

1,071,203.　　　　Specification of Letters Patent.　　Patented Aug. 26, 1913.

Application filed March 25, 1913. Serial No. 756,685.

*To all whom it may concern:*

Be it known that I, RUSSELL S. CARTER, a citizen of the United States, residing at Hewlett, in the county of Nassau and State of New York, have invented a certain new and useful Improvement in Water-Feed-Drill Chucks, of which the following is a specification.

This invention relates to water feeding percussive drills and more particularly to a chuck and hollow drill steel for use with such drills. In drills of this type, such as shown for instance in the patent to Prellwitz No. 710,922, October 7th, 1902, a difficulty has been encountered in getting a connection between the water bore in the piston rod and the bore in the drill steel which will be free from leakage under the strain imposed by the operation of the drill. Different types of connection have been tried consisting in the main of elements bridging the point between the two bores but all connections used have become leaky under operation.

The object of the present invention is to provide a joint between the piston rod and the drill steel which will minimize leakage at this point and which will not be made loose and leaky by the operation of the drill, thus increasing the efficiency of the water feed and preventing leakage at the drill chuck which results in wetting the operator and the ground on which he is obliged to stand.

With this object in view I have devised a piston chuck and drill steel, a practical embodiment of which is shown in the accompanying drawings in which—

Figure 1 shows a longitudinal section through the chuck and part of the drill steel and piston rod, Fig. 2 shows a transverse section on the line II—II of Fig. 1, Fig. 3 shows a detail view of the chuck bushing, and Fig. 4 shows the washer 10$^a$ in detail.

In the drawings, as shown, the outer end 1 of the piston rod of a drill, such as is shown in the patent to Prellwitz as mentioned above, the piston rod 1 terminates in a chuck 2 provided with a longitudinal drill steel receiving bore. Running longitudinally of the piston rod is a water bore 3 which has a laterally deviating portion 4 near the chuck which passes by the inner end of the steel receiver bore and opens into the side of the steel receiving bore near its inner end through a port 5, which has the form of a shallow cylindrical bore of larger diameter than the water bore. Into the chuck is inserted a steel 6 of hexagonal or other section which is provided with a longitudinal bore 7 which does not run through to the rear end of the drill steel. From the side of the bore 7 a backwardly inclined water passage 8 runs to one of the side faces of the drill steel, its outer opening being in such a position that it registers with the port 5 when the drill steel is in an operative position in the chuck. Between the steel and the inner surface of the chuck bore is placed a bushing 9 the outer surface of which is rounded to fit the chuck bore and the inner surface of which is so shaped as to conform to the shape of the drill steel. This is provided with an aperture 10, the outer part of which is of such a diameter as to register with port 5 and the inner part of which is reduced to a size slightly larger than the opening of passage 8. To insure a tight fit a rubber washer 10$^a$ is fitted into the aperture 10, this washer being of sufficient width to extend into the port 5, and also to press against the surface of the drill steel 6 around the opening of passage 8. This however is not necessary and can be dispensed with if desired. Fitting into a slot in the other side of the chuck bore is a chuck key 11 which rests against the drill steel on the side opposite to the passage 8. All the parts are held in operative position by a U bolt 12 which fits over the key 11 and is tightened by means of nuts 13 on the other face of the chuck.

It will be evident from the description and drawings that the pressure caused by the tightening of the nuts on the U bolts when the parts are assembled will press the contacting surfaces of the drill steel, chuck bushing and the chuck, where the port 5, slot 10 and the passage 8 occur, closely together, producing a tight joint and one which will minimize leakage. A slight longitudinal movement of the steel in the chuck which is impossible to avoid even where the U bolt nuts are very tightly drawn up, will not cause any separation of the surfaces in which the water conveying openings are present and will not therefore develop leakage upon service. Furthermore any wear occurring on the contacting surfaces of the steel, bushing and chuck is automatically taken up simply by tightening the U bolt nuts without a disturbance of the alinement of the water passages, which is bound to occur where the connection comes in the rear faces of the chuck bore and the rear end of the drill steel. Any wear moreover serves rather to make the joints tighter by making a more perfect contact between the parts.

It is to be understood that the present showing and description discloses only one specified modification of my invention and other forms and modifications are included in the spirit and scope of the invention as expressed in the claims.

What I claim is:

1. In a water feed drill, a piston rod having a longitudinal water passage therethrough, a chuck on said piston rod having a drill steel receiving aperture, said water passage having an opening into a lateral face thereof, a drill steel having a longitudinal bore with a lateral passage opening therefrom registering with said water opening and means to press the surfaces having said openings into close contact with each other.

2. In a water feed drill, a piston rod having a longitudinal water passage therethrough, a chuck on said piston rod having a drill steel receiving bore, said water passage having an opening into the side thereof, a drill steel having a longitudinal bore and a lateral opening therefrom registering with said chuck bore side opening, and steel retaining means positioned to press the surfaces containing said openings together.

3. In a water feed drill a piston rod having a longitudinal water passage therethrough, a chuck on the end of said piston rod, having a drill steel receiving bore, said water passage opening into the side of said drill steel receiving bore, a drill steel having a longitudinal bore and a lateral opening therefrom, and a bushing interposed between said chuck bore surface and said steel, having a larger opening registering with said openings in said chuck and said steel and adapted to connect said openings in different longitudinally relative positions.

4. In a water feed drill, a piston rod having a longitudinal water passage therethrough, a chuck on the end of said piston rod, having a drill steel receiving bore, said water passage opening into the side of said drill steel receiving bore, a drill steel having a longitudinal bore and a lateral opening therefor, a bushing interposed between said chuck bore surface and said steel, having a larger opening registering with said openings in said chuck and said steel and adapted to connect said openings in different longitudinally relative positions, and fastening means adapted to press the surfaces having said openings together.

In testimony whereof, I have hereunto set my hand.

RUSSELL S. CARTER.

Witnesses:
FRED. F. OVERTON,
ALICE C. BRORSTROM.

---

Copies of this patent may be obtained for five cents each, by addressing the "Commissioner of Patents, Washington, D. C."